United States Patent [19]

Eby et al.

[11] 4,237,198
[45] Dec. 2, 1980

[54] ELECTRICAL DEVICE WITH BI-LEVEL BATTERY STATE-OF-CHARGE INDICATOR

[75] Inventors: Richard L. Eby, Marshfield; Lester E. Wilson, Bedford, both of Mass.

[73] Assignee: Anderson Power Products, Inc., Boston, Mass.

[21] Appl. No.: 72,879

[22] Filed: Sep. 6, 1979

[51] Int. Cl.³ .......................................... H01M 10/48
[52] U.S. Cl. ...................................... 429/93; 429/178
[58] Field of Search .................................. 429/91–93, 429/178

[56] References Cited

U.S. PATENT DOCUMENTS

| | | | |
|---|---|---|---|
| 3,460,995 | 8/1969 | Webb | 429/93 |
| 3,600,234 | 8/1971 | Massie, Jr. | 429/93 |
| 3,956,720 | 5/1976 | Vest | 429/93 X |

Primary Examiner—Charles F. LeFevour
Attorney, Agent, or Firm—Richard J. Birch

[57] ABSTRACT

An electrical device for use with electric storage batteries has a bi-level battery state-of-charge indicator incorporated therein. The electrical device is shown as a battery cable connector and a battery cable clamp. The built-in indicator provides an indication of the battery state-of-charge when the battery reads a preselected state-of-charge and continues to provide such an indication until the battery has been discharged to a preselected state. The indicator utilizes a light emitting diode to monitor the battery state-of-charge through the use of bi-level voltage comparator circuit.

4 Claims, 3 Drawing Figures

ELECTRICAL DEVICE WITH BI-LEVEL BATTERY STATE-OF-CHARGE INDICATOR

BACKGROUND OF THE INVENTION

This invention relates to electrical devices in general, and, more particularly, to electrical devices for use with electric storage batteries that have a bi-level battery state-of-charge indicator incorporated in the device.

Electric storage battery packs are widely used in the electro-motive industry to provide electrical power for electrically driven vehicles such as, fork-lift trucks. The battery pack is connected to the vehicle's drive system through a plural conductor battery cable and electrical connector. Representative examples of such electrical connectors are shown in U.S. Pat. Nos. 3,091,746 and 3,794,957.

Typically, in multi-vehicle applications, the discharged battery pack, together with its attached battery cables and electrical connector, is removed from the vehicle after a duty cycle. The discharged battery pack is replaced with a freshly charged battery pack from the "battery room." The removed discharged battery pack is then recharged along with other discharged battery packs in the "battery room."

It is desirable that the "battery room" operator know the charge states of the various battery packs in the "battery room" so that only fully charged battery packs are placed in the vehicles. Various methods are currently employed to determine the charge states of the batteries. The specific gravity of the electrolyte in each battery cell can be measured with a hydrometer to provide an indication of the charge state of the individual cell and, cumulatively, of the battery itself. However, this method is both tedious and time consuming for the "battery room" operator.

Many modern battery chargers contain an indicator, such as a lamp, to show the charge state of the battery under charge on the charges. In such chargers when the battery reaches a preselected state-of-charge, the indicator provides a suitable indication, e.g., the indicator lamp goes on. Generally, the achievement of the preselected state-of-charge is determined by monitoring the battery voltage. When the battery voltage reaches a preselected percentage of the fully charged battery voltage, the indicator lamp is turned on and will remain on until the battery is disconnected from the charger.

In the battery-motive industry the battery voltage for indicator lamp "turn on" is generally referred to as the "TVR" voltage after the "timer-voltage-relay" and, typically, equals approximately 90% of the fully charged battery voltage. Although the battery charger indicator provides an indication of the charge state of the battery or batteries in a battery pack, it is operative and useful only as long as the battery or battery pack is connected to the charger.

In a busy "battery room" operation, the battery charger(s) is used to charge a number of battery packs during a shift. The freshly charged battery packs are stored for later replacement in vehicles. Once the charged battery packs have been removed from the charger, the "battery room" operator no longer has an indication of the charge condition of the battery pack. It is not at all unusual for a "battery room" operator to become confused as to the charge state of a particular battery pack and to replace a discharged battery pack with another discharged battery pack. The discharged replacement battery pack may still have a sufficient charge to allow the vehicle operator to drive the vehicle for some short period of time. Thereafter, when the battery pack fails, the vehicle must be towed back to the "battery room" or another battery pack must be delivered to the vehicle. Both operations are time consuming and costly.

It is accordingly an object of the invention to provide an electrical device for use with electric storage batteries that has a bi-level battery charge state indicator incorporated in the device.

It is another object of the invention to provide such an electrical device in which the battery charge state indicator produces an indication when the battery reaches a pre-selected state-of-charge during charging and continues to produce such an indication until the battery has been discharged to a preselected state.

It is a feature of the invention that the bi-level battery charge state indicator of the electrical device continues to provide an indication of the battery's charge state after the battery has been disconnected from the battery charger.

BRIEF DESCRIPTION OF THE INVENTION

An electrical device, such as a battery cable clamp or electrical connector, has a bi-level battery charge state indicator incorporated therein. The indicator employs a bi-level battery voltage comparator to control the energization state of a light emitting diode (LED) indicator lamp. When the battery reaches a first preselected voltage level or charge state during the charging operation, the LED is energized and remains on until the battery voltage drops to a lower, second preselected voltage level. The LED remains off until the battery is again charged up to the higher, first preselected voltage level.

The objects and features of the invention mentioned above and other objects and features of the invention will best be understood from the following detailed description of a preferred embodiment of the invention, selected for purposes of illustration and shown in the accompanying drawings, in which.

DETAILED DESCRIPTION OF THE PREFERRED EMBODIMENT

Figure 1:
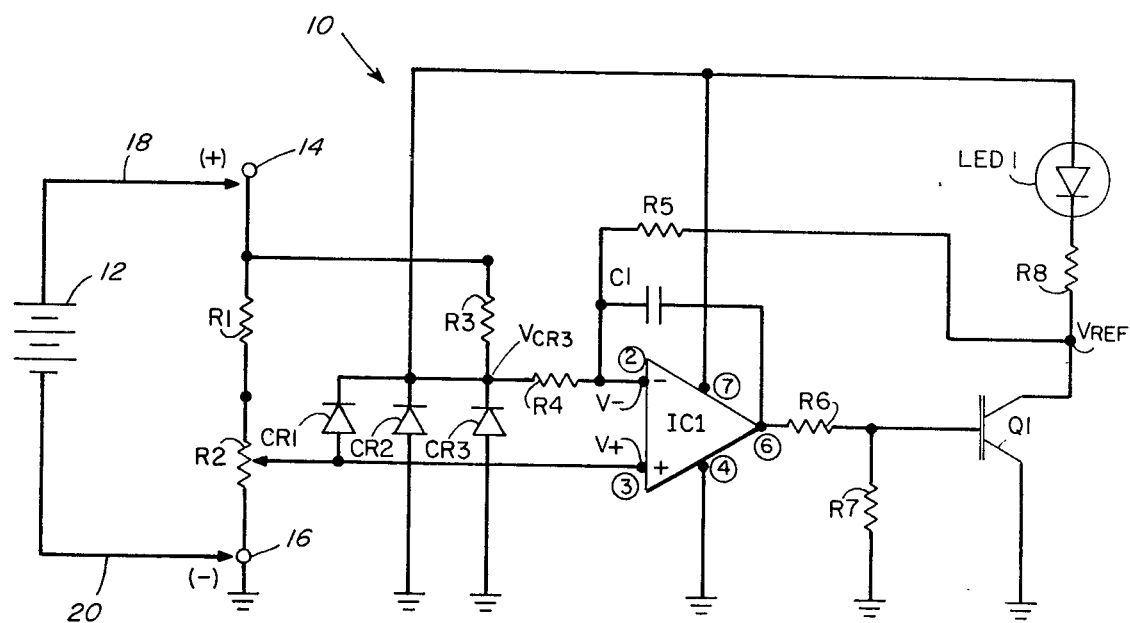
FIG. 1 is a schematic diagram of the circuitry of the bi-level battery charge state indicator that is incorporated in the electrical device of the present invention.

Turning now to the drawings and in particular to FIG. 1 thereof, there is shown in schematic form a bi-level charge state battery indicator circuit indicated generally by the reference numeral 10. This circuit is described in detail in the copending application of Richard L. Eby filed simultaneously herewith on Sept. 6, 1979 as Ser. No. 072,865 for Bi-Level Battery State-of-Charge Indicator And Method and assigned to the same assignee as this application.

Figure 2:
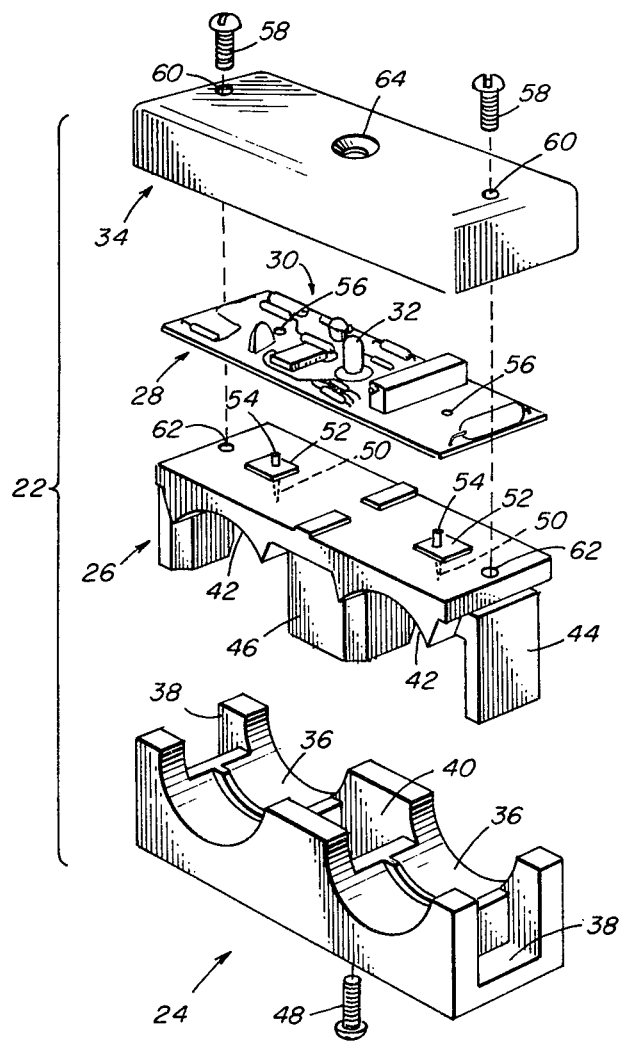
FIG. 2 is an exploded view of a battery cable clamp embodiment of the invention; and, FIG. 3 is a view in perspective, partially broken away of an electrical connector embodiment of the invention.
Figure 3:
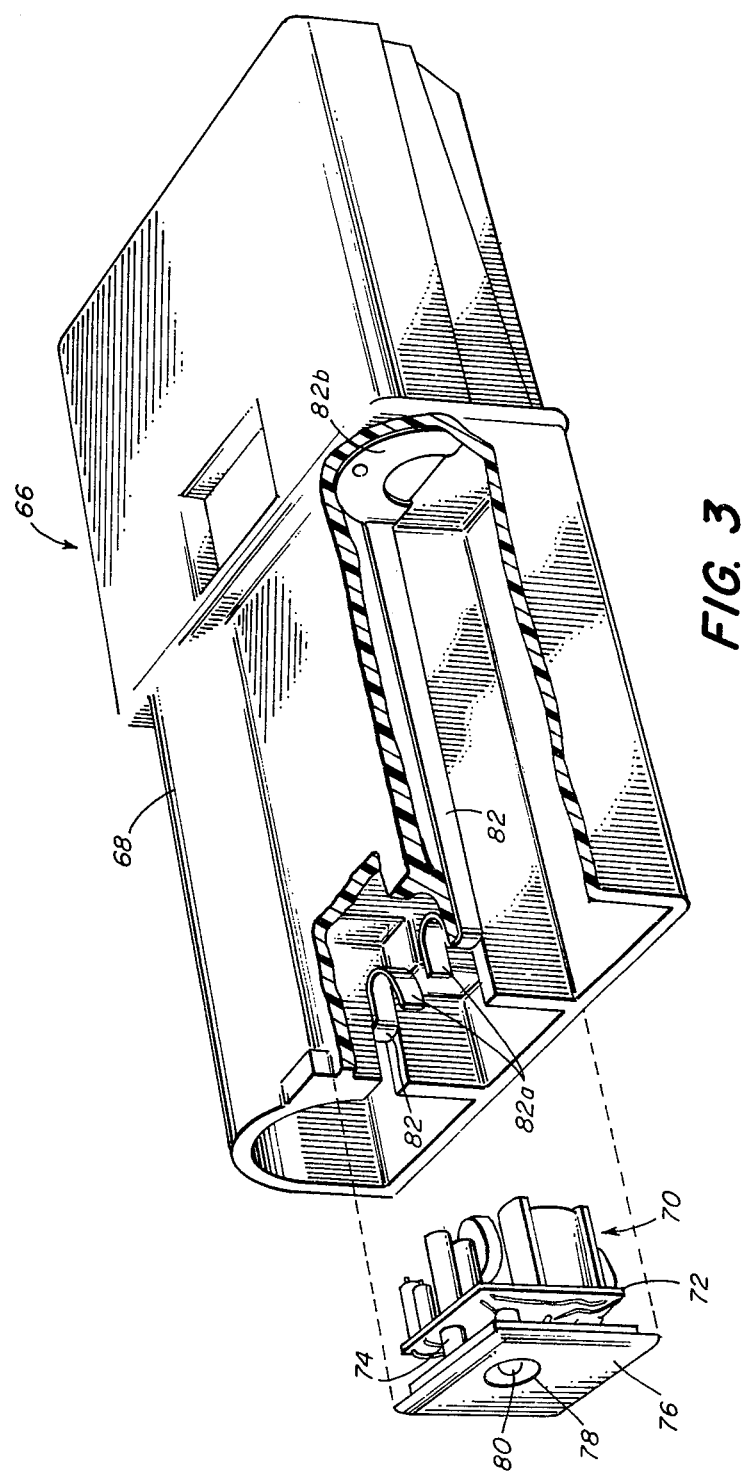

In order to fully understand the battery cable clamp and electrical connector embodiments of the invention shown in FIGS. 2 and 3, respectively, it will be helpful to first describe the bi-level charge state circuit 10. Referring to FIG. 1, a battery 12, such as a lead-acid storage battery, is electrically connected to circuit input terminals 14 and 16 through cables 18 and 20, respectively. The battery voltage to be monitored is thus placed across resistors R1 and R2, and hence applied to the remainder of circuit 10.

The other major elements of the bi-level battery charge state indicator comprise an indicator light LED1; an operational amplifier IC1 functioning as a comparator; and a transistor Q1, that is turned on and off by IC1 and that in turn controls the current through LED1 and, therefore, its energization (illumination) state.

Table 1 below presents a list of components values used in construction of a prototype of the circuit.

TABLE 1

| R2 | 50 K | All resistors are |
| --- | --- | --- |
| R4 | 10 K | 50% to 1 and ¼ |
| R5 | 68 K | watt unless otherwise specified. |
| R6 | 12 K | |

| Battery Voltage | R1 (1% tol.) | R3 (5% tol.) |
| --- | --- | --- |
| 12 | 49.9 K | 470 (.5 watt) |
| 24 | 150 K | 1.3 K (1 watt) |
| 36 | 249 K | 2.4 K (1 watt) |
| 48 | 348 K | 3.3 K (2 watt) |
| 72 | 604 K | 5.1 K (3 watt) |

| CR1 | DE113 (General Electric) |
| --- | --- |
| CR2 | IN914 |
| CR3 | IN823A |
| LED1 | XC5053 (Intermarket) |
| IC1 | TL061CP (T.I.) |
| Q1 | 2N5172 |
| C1 | .22 F, 10V (min) |

For the purposes of this description, battery 12 is assumed to be a 12 volt lead-acid battery. Such a battery consists of six cells, each with a maximum potential of 2.4 volts. The battery typically is considered to be charged when its potential reaches 14.1 volts, or 2.35 volts per battery cell. By changing the values of resistors R1 and R3 as shown in Table 1, batteries of other voltages may be monitored.

As battery 12 is charged the voltage $V_{BAT}$ applied to terminals 14 and 16 gradually increases. The voltage $V_+$ placed on the non-inverting terminal of IC1 is fixed by the voltage divider created by resistances R1 and R2. $V_+$ is directly proportional at all times to the battery voltage. In particular:

$$V_+ = V_{BAT}(\frac{R_2}{R_1 + R_2})$$

During the initial phase of charging, the voltage placed on the inverting terminal of IC1, $V_-$, is fixed by the voltage across zener diode CR3 (6.2 volts). The values of resistors R1 and R2 have been chosen to keep $V_+$ below $V_-$ during the charging period. Since $V_-$ is greater than $V_+$, the output of comparator IC1 is driven negative. This turns transistor Q1 off, setting $V_{REF}$ equal to $V_{CR3}$ and $V_-$. In this state no current flows through LED1, R8, R4 or R5.

As the battery continues to charge, $V_+$ increases and eventually surpasses the zener voltage. When $V_+$ becomes greater than $V_-$ the output voltage of comparator IC1 switches from negative to positive. This positive voltage applied to the base of transistor Q1 switches the transistor on. $V_{REF}$ drops to approximately 0.22 volts as current is permitted to flow to ground through Q1. Since $V_{REF}$ is now less than $V_{CR3}$, current begins to flow through LED1 and R8, causing LED1 to glow. This informs the operator that the battery is charged to a value of 2.35 volts per battery cell. Current also flows through resistors R4 and R5. The resulting voltage drop across R4 causes $V_-$ to be less than the zener voltage, $V_{CR3}$. The decrease in $V_-$ is determined by the voltage divider created by R4 and R5.

After LED1 is illuminated, as described above, the human operator knows that the battery has reached a preselected state of change, typically the "TVR" or 90% or above point. From this point, until a load is placed upon the battery and the battery begins to discharge, the state of the circuit remains constant, with LED1 illuminated.

After the battery is placed into service, $V_{BAT}$ gradually decreases as the battery discharges. $V_+$ continues to track $V_{BAT}$ and is initially greater than the depressed value of $V_-$. The output of comparator IC1 remains positive. Transistor Q1 continues to permit current through LED1, causing LED1 to glow.

As discharging continues $V_+$ falls below the value of $V_-$, the output voltage of comparator IC1 swings from positive to negative, and switches off transistor Q1. With Q1 off, current through LED1, R8, R4 and R5 ceases and LED1 stops glowing. $V_{REF}$ rises to equal $V_{CR3}$. The voltage drop across R4 disappears and $V_-$ rises to equal $V_{CR3}$.

Regarding the lead-acid battery used for purposes of illustration in this discussion, the change of state in circuit 10 occurs when $V_{BAT}$ falls to a value between 12.0 and 12.3 volts (2.0 to 2.05 volts per battery cell). At this point the circuit has returned to its original state as defined at the start of this description. During the remainder of the discharge process, $V_-$ remains greater than $V_+$.

The battery charge state indicator circuit 10 normally includes a number of protective devices. Diodes CR1 and CR2 protect the circuit from any large voltage spikes generated by the battery or the charging device. Resistor R8 limits the amount of current flowing through indicator light LED1 to a maximum of 8 milliamperes. C1 is a small capacitor that smooths the output voltage of IC1 to prevent small transients in $V_{BAT}$ from triggering the circuit. Resistors R6 and R7 ensure proper biasing of transistor Q1. Resistor R3 limits the amount of current flowing through CR3 and LED1.

The selection of values for R1 and R3 from Table 1 provides approximate calibration of the circuit for the desired battery voltage. Fine calibration is achieved by varying the resistance of potentiometer R2. The calibration procedure is performed as follows:

(1) Potentiometer R2 is turned fully counterclockwise to offer minimum resistance.

(2) A voltage of 2.35 volts per battery cell is applied across terminals 14 and 16. LED1 should be off.

(3) R2 is adjusted clockwise until LED1 lights.

(4) The voltage applied is lowered until LED1 no longer glows. The observed voltage should be between 2.0 and 2.05 volts per battery cell, provided proper values of R4 and R5 have been used.

Having described the bi-level battery charge state indicator circuitry, we will now discuss the battery cable clamp and electrical connector embodiments of our invention. Referring to FIG. 2, there is shown in exploded view a battery cable clamp with an integral bi-level battery charge state indicator indicated generally by the referenced numeral 22. The major components of the battery cable clamp 22 comprise a lower yoke 24 and upper yoke 26, a circuit board 28 containing circuit components 30 which form the bi-level charge state indicator and include LED 32 and a cover 34. The terms "upper" and "lower" are used herein only for purposes of discussion and should not be construed as defining any gravity orientation of the battery cable clamp 22.

The lower yoke 24 has a pair of battery cable receiving saddles 36, a pair of slots 38 formed in the ends of the yoke 24 and a centrally located receptacle 40. The upper yoke 26 has a corresponding pair of battery cable receiving saddles 42, a pair of downwardly extending outer legs 44 having a size and configuration adapted to fit within the corresponding slots 38 located on the lower yoke 24, and a downwardly depending centrally located leg 46 having a size and configuration adapted to fit within the centrally located receptacle 40 of the lower yoke 24.

It will be appreciated that when the upper and lower yokes are assembled in mating relation, they will clamp within their respective saddles a pair of battery cables 20 (not shown). The two yokes are held in mated relation by means of a threaded fastener 48 that extends through an aperture (not shown) in the lower yoke and engages a threaded receptacle (not shown) on the downwardly extending centrally located leg 46 of the upper yoke.

The upper yoke 26 has a pair of battery cable insulation piercing pins 50 that are located to establish electrical contact with the battery cables when the cables are positioned within the yoke saddles and the two yokes are essembled in mating relation. The pins 50 are in electrical contact with circuit board connector pads 52. The circuit board 28 is located on the upper yoke 26 by means of locator pins 54 that extend through corresponding locator apertures 56 in the circuit board. Thus, when the circuit board is positioned on the locator pins 54 of the upper yoke, it is in electrical contact with the battery cables through the connector pads 52 and the battery cable insulation piercing pins 50.

The protective cover 34 is secured to the upper yoke 26 by means of threaded fasteners 58 that extend through cover appertures 60 to threadably engage corresponding threaded receptacles 62 in the upper yoke 26.

The cover 34 has an apperture or "window" 64 located with respect to the circuit board 28 so that LED 32 will be visible through the window 64 after the cover and circuit board are assembled on the upper yoke 26.

When the battery cable clamp 22 is used with a pair of battery cables that are connected to an electric storage battery, LED 32 provides a convenient and readily visible indication of the state-of-charge of the battery for both the "battery room" operator and the vehicle operator. This indication is available even though the battery has been disconnected from the battery charger.

Referring now to FIG. 3, there is shown in perspective view and partially broken-away the electrical connector embodiment of the present invention in which the bi-level battery charge state circuit is incorporated in an electrical connector indicated generally by referenced numeral 66. For purposes of illustration, the electrical connector 66 depicted in FIG. 3 is of the type described in the previously mentioned U.S. Pat. Nos. 3,091,746 and 3,794,957.

The connector 66 is a plural-pole, genderless electrical connector having a hollow insulated housing 68 within which are positioned two spring biased rigid terminal members (not shown) that are carried in detached relation to the walls of the housing. The terminal members are electrically connected by crimping, soldering, or other means to battery cables (not shown). For a detailed description of the structure of the electrical connector 66, reference is made to U.S. Pat. No. 3,794,957, the subject matter of which is incorporated herein by reference.

The bi-level battery state-of-charge indicator circuit components, indicated generally by the referenced numeral 70, are mounted on a circuit board 72 which in turn is mounted through stand-offs 74 on a cover plate 76. The cover plate 76 has an aperture or window 78 to permit viewing of LED 80. The resulting assembly of the cover plate, circuit board and circuit components is inserted into the rear of the electrical connector housing 68 as shown by the dashed lines in FIG. 3.

The battery voltage monitored by the bi-level battery state-of-charge indicator is applied to the circuit board 72 through a pair of flexible, electrically conductive circuit board contacts 82 having one end thereof 82a in electrical contact with the circuit board 72 and the other end thereof 82b in electrical conductive contact with the rigid terminal (not shown) of the electrical connector 66.

When the electrical connector and battery cables are connected to a battery or battery pack, the LED 80 provides an indication of the state-of-charge of the battery or battery pack. In this manner the electrical connector 66 provides a self-contained indicator of the battery or battery pack state of charge even though the battery or pack has been disconnected from the battery charger.

Having described in detail our invention, it will now be obvious to those skilled in the art the numerous modifications can be made to the embodiment shown in the drawings without departing from the scope of the invention as defined in the following claims. For example, the visual indication provided by the LED is an ON-OFF indication. Other types of indications can be employed to achieve two distinguishable indication states. Such types of indication include different colored LED's, blinking lights and the like.

What we claim and desire to secure by Letters Patent of the United States is:

1. A battery cable clamp comprising:
   (1) first and second mating yoke means each having a pair of cable receiving saddles that define two generally circular cable openings when the first and second yoke means are mated together.
   (2) means for releaseably holding said first and second in mated relation;
   (3) first and second electrically conductive cable insulation piercing means mounted on said first yoke means so that electrical contact is made with both cables when the cables are positioned in the cable receiving saddles in the first and second yoke means and the two yoke means are mated together;
   (4) means mounted on said first yoke means for providing a first indication when a voltage applied to said first and second cable insulation piercing means reaches a preselected, first voltage level;
   (5) means for maintaining said first indication until the applied voltage reaches a preselected, second and lower voltage level;
   (6) means for providing a second indication when the applied voltage reaches said preselected, second and lower voltage level; and, (7) means for continuing the second indication until the applied voltage again reaches said preselected, first voltage level.

2. The battery cable clamp of claim 1 wherein said means for providing first and second indications includes means for providing a visual indication.

3. The battery cable clamp of claim 2 wherein the visual indications are produced by an electrically actuated visual indicator and the visual indication is turned on when the electric storage battery reaches the preselected, first voltage level during a charging operation and is turned off when the electric storage battery reaches the preselected, second and lower voltage level during a discharging operation.

4. The battery cable clamp of claim 2 wherein said means for providing a visual indication has an electrically actuated binary ON-OFF illumination state that is turned ON when the applied voltage reaches the preselected, first voltage level and is turned OFF when the applied voltage reaches the preselected, second and lower voltage level.

* * * * *